United States Patent
Zulaika et al.

(10) Patent No.: US 11,368,061 B2
(45) Date of Patent: Jun. 21, 2022

(54) ROTATING ELECTRIC MACHINE AND STATOR HAVING SLANTED PORTIONS

(71) Applicant: HITACHI AUTOMOTIVE SYSTEMS, LTD., Hitachinaka (JP)

(72) Inventors: Mohdbasir Zulaika, Hitachinaka (JP); Shinji Yamazaki, Hitachinaka (JP); Shinjirou Watari, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/966,517

(22) PCT Filed: Dec. 26, 2018

(86) PCT No.: PCT/JP2018/047722
§ 371 (c)(1),
(2) Date: Jul. 31, 2020

(87) PCT Pub. No.: WO2019/150858
PCT Pub. Date: Aug. 8, 2019

(65) Prior Publication Data
US 2021/0044161 A1 Feb. 11, 2021

(30) Foreign Application Priority Data
Feb. 1, 2018 (JP) .............................. JP2018-016630

(51) Int. Cl.
*H02K 1/18* (2006.01)
*H02K 3/52* (2006.01)
(Continued)

(52) U.S. Cl.
CPC .............. *H02K 1/18* (2013.01); *H02K 3/525* (2013.01); *H02K 3/527* (2013.01); *H02K 3/32* (2013.01);
(Continued)

(58) Field of Classification Search
CPC .......... H02K 1/18; H02K 3/325; H02K 3/527; H02K 5/00; H02K 5/04; H02K 3/32; H02K 3/52
(Continued)

(56) References Cited

U.S. PATENT DOCUMENTS

2013/0106232 A1* 5/2013 Kobayashi ........... H02K 15/095
310/208
2017/0358961 A1* 12/2017 Kitamura ............... H02K 1/185
(Continued)

FOREIGN PATENT DOCUMENTS

| JP | 2002-218714 A | 8/2002 |
| JP | 2003-284277 A | 10/2003 |

(Continued)

OTHER PUBLICATIONS

International Search Report with English translation and Written Opinion issued in corresponding application No. PCT/JP2018/047722 dated Mar. 12, 2019.
(Continued)

*Primary Examiner* — Rashad H Johnson
(74) *Attorney, Agent, or Firm* — Foley & Lardner LLP

(57) ABSTRACT

An object of the present invention is to improve the fixing force of a stator core at low cost. The rotating electric machine includes a stator 300 in which a plurality of stator cores 400 are annularly arranged, a rotor to be arranged on the inner circumferential side of the stator 300, and a housing 500 having a cylindrical shape for fixing each of the plurality of stator cores 400. The stator core 400 has outer circumferential surfaces 410 and 420 arranged to face the inner circumferential surface 510 of the housing 500, and the outer circumferential surfaces 410 and 420 of the stator core 400 are slanted with respect to the inner circumferential surface 510 of the housing 500.

5 Claims, 7 Drawing Sheets

(a) SIDE OF STATOR (b) PARTIALLY ENLARGED VIEW OF CROSS-SECTION D-D (c) PARTIALLY ENLARGED VIEW OF CROSS-SECTION E-E

(51) Int. Cl.
*H02K 3/32* (2006.01)
*H02K 5/00* (2006.01)
*H02K 5/04* (2006.01)

(52) U.S. Cl.
CPC .............. *H02K 3/325* (2013.01); *H02K 5/00* (2013.01); *H02K 5/04* (2013.01)

(58) Field of Classification Search
USPC ................ 310/67 R, 89, 91, 49.35, 216.001, 310/216.015, 216.088
See application file for complete search history.

(56) References Cited

U.S. PATENT DOCUMENTS

| 2018/0262067 | A1 | 9/2018 | Utsumi et al. | |
| 2020/0106312 | A1* | 4/2020 | Taniguchi | H02K 1/16 |
| 2020/0395806 | A1* | 12/2020 | Kim | H02K 3/34 |
| 2021/0167674 | A1* | 6/2021 | Tsuda | H02K 1/16 |

FOREIGN PATENT DOCUMENTS

| JP | 2014-103716 A | 6/2014 |
| JP | 2015-192592 A | 11/2015 |
| JP | 2016-192831 A | 11/2016 |
| WO | WO-2014/128938 A1 | 8/2014 |
| WO | WO-2017/057435 A1 | 4/2017 |

OTHER PUBLICATIONS

Extended European Search Report issued in corresponding European Patent Application No. 18904296.3 dated Sep. 30, 2021.

Office Action issued in corresponding Japanese Patent Application No. 2019-568944 dated Jun. 15, 2021 with English machine translation.

* cited by examiner (a) SIDE OF STATOR CORE (b) CROSS SECTION B-B  (c) CROSS SECTION C-C (a) WINDING WORK AT FIRST STAGE (b) WINDING WORK AT SECOND STAGE (b) PARTIALLY ENLARGED VIEW OF CROSS-SECTION D—D (a) SIDE OF STATOR (c) PARTIALLY ENLARGED VIEW OF CROSS-SECTION E—E (a) MEASUREMENT RESULT OF SHAPE OF CROSS-SECTION D—D (b) MEASUREMENT RESULT OF SHAPE OF CROSS-SECTION E—E

ROTATING ELECTRIC MACHINE AND STATOR HAVING SLANTED PORTIONS

TECHNICAL FIELD

The present invention relates to a rotating electric machine and a stator.

BACKGROUND ART

Conventionally, there is known a rotating electric machine having a split core structure in which a stator is formed by fixing a stator core split into a plurality of parts to a housing having a cylindrical shape by shrink fitting or press fitting. In the rotating electric machine having such a structure, it is preferable to improve the fixing force for fixing the stator core to the housing in order to cope with the increase in torque. However, if the fixing force is too high, the stator core may be deformed by the stress received by the stator core, which may cause deterioration of magnetic characteristics and a buckling phenomenon. Thus, there has been proposed a method for improving the fixing force of the stator core while suppressing the deformation of the stator core.

The PTL 1 below describes a following press-fit fixing structure. The radial end surface 12a of the stator core 12 includes a plurality of core protruding portions 25 intermittently formed in the circumferential direction, the inner circumferential surface 13a of the stator holder 13 includes a plurality of holder protruding portions 27 intermittently formed in the stacking direction of a plurality of steel plates 18 (axial direction), and when the radial end surface 12a of the stator core 12 is press fitted into the inner circumferential surface 13a of the stator holder 13, the core protruding portions 25 plastically deform the holder protruding portions 27 and enters the inside of the surface of the inner circumferential surface 13a of the stator holder 13, and the axial direction end portion 29 of the inner circumferential surface 13a of the stator holder 13 is formed flat in the stacking direction.

CITATION LIST

Patent Literature

PTL 1: JP 2014-103716 A

SUMMARY OF INVENTION

Technical Problem

In the press-fit fixing structure described in PTL 1, complicated machining is required to form an uneven shape on both the radial end surface of the stator core and the inner circumferential surface of the stator holder, and the machining cost increases. Therefore, there is a demand for a structure that can improve the fixing force of the stator core at low cost.

Solution to Problem

A rotating electric machine according to the present invention includes: a stator in which a plurality of stator cores are annularly arranged; a rotor arranged on an inner circumferential side of the stator; and a housing having a cylindrical shape and configured to fix each of the plurality of stator cores. Each of the stator cores has an outer circumferential surface arranged to face an inner circumferential surface of the housing. The outer circumferential surface of each of the stator cores is slanted with respect to the inner circumferential surface of the housing.

A stator according to the present invention is the one used in a rotating electric machine, the stator including a plurality of stator cores arranged in an annular shape, each of the plurality of stator cores being fixed to a housing having a cylindrical shape. Each of the stator cores has an outer circumferential surface arranged to face an inner circumferential surface of the housing. The outer circumferential surface of each of the stator cores is slanted with respect to the inner circumferential surface of the housing.

Advantageous Effects of Invention

According to the present invention, the fixing force of the stator core can be improved at low cost.

DESCRIPTION OF EMBODIMENT

Hereinafter, an embodiment of the present invention will be described with reference to the drawings.

Figure 1:
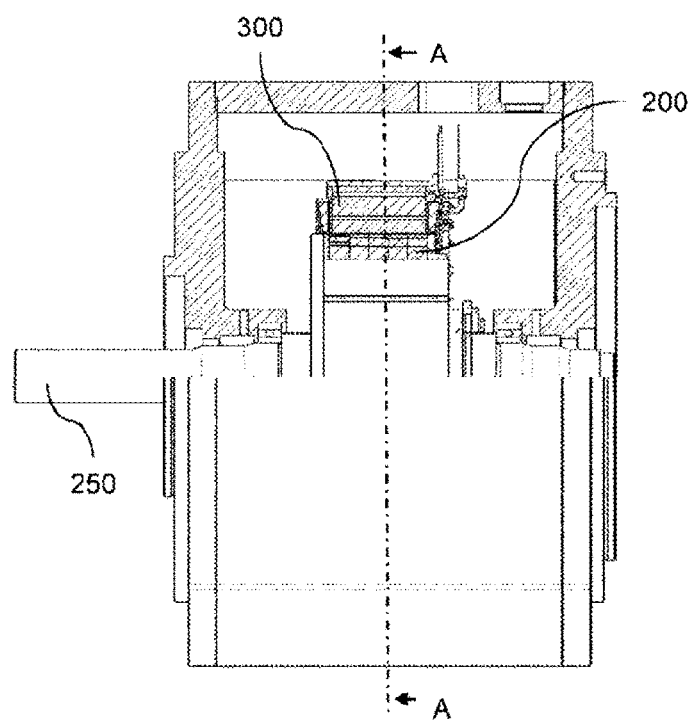
FIG. 1 is a partial sectional view of a rotating electric machine according to an embodiment of the present invention.

FIG. 1 is a partial sectional view of a rotating electric machine 100 according to an embodiment of the present invention. The partial sectional view in FIG. 1 shows a cross-sectional shape of the rotating electric machine 100 cut along the rotating shaft 250. The rotating electric machine 100 is a device for converting electric energy into rotational energy, and includes a rotor 200, a rotating shaft 250, and a stator 300.

The stator 300 generates a magnetic field by the current flowing through the conductor, and includes a plurality of stator cores arranged in an annular shape, as will be described below. It should be noted that since the rotating electric machine 100 is mounted on, for example, an automobile and used for traveling drive of the automobile, the rotating electric machine 100 is generally formed to be large in the radial direction so as to be able to output a large amount of rotational energy. Therefore, when the rotating electric machine 100 is rotationally driven, a large load is applied to each stator core in the circumferential direction.

The rotor 200 includes a plurality of magnets arranged along the outer circumferential surface thereof, and is rotationally driven due to the magnetic field caused by the magnets being affected by the magnetic field caused by the stator 300. The rotating shaft 250 is connected to the central portion of the rotor 200, and rotational energy of the rotor 200 is transmitted to the rotating shaft 250. The rotor 200 is arranged on the inner circumferential side of the stator 300 and faces the stator 300 with a predetermined gap interposed therebetween in the radial direction.

Figure 2:
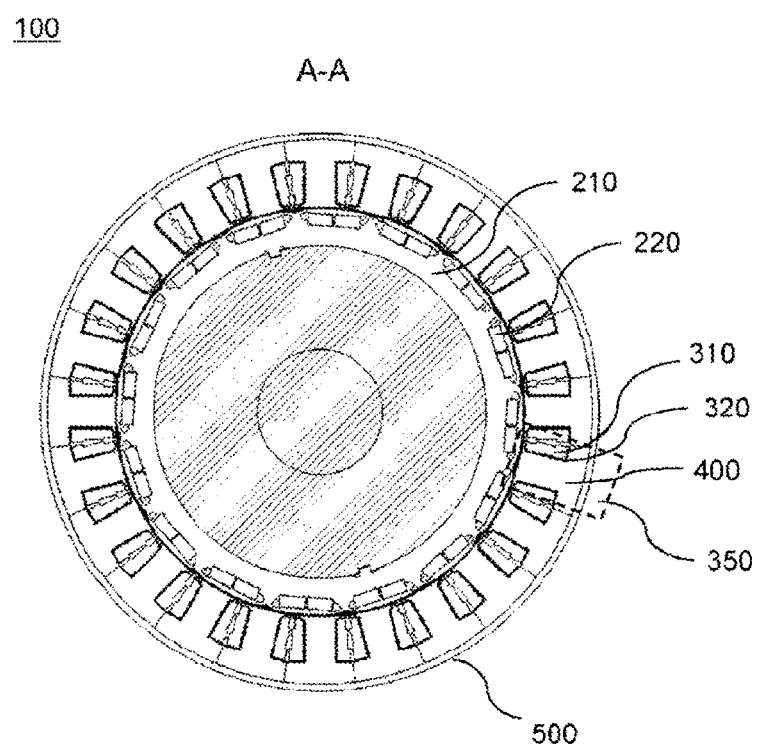
FIG. 2 is a cross-sectional view of the rotating electric machine taken along line A-A.

FIG. 2 is a cross-sectional view of the rotating electric machine 100 taken along line A-A shown in FIG. 1. As shown in FIG. 2, the rotor 200 includes a rotor core 210 and a plurality of permanent magnets 220. The rotor core 210 forms a magnetic path and stores the permanent magnets 220. The permanent magnets 220 generate magnetic flux, and cause the rotor 200 to rotate by the attraction force with the rotating magnetic field generated in the stator 300.

The stator 300 is formed by arranging a plurality of teeth cores 350 in an annular shape to fix them to the housing 500. It should be noted that in FIG. 2, one teeth core 350 is shown surrounded by a broken line frame. Each teeth core 350 is configured by winding the coil 310 around the stator core 400 via a resin bobbin 320 for insulation. The stator core 400 of each teeth core 350 is fixed to the inner circumferential side of the housing 500 by interference fit. That is, arranging side by side in an annular shape a plurality of stator cores 400 around which the respective coils 310 are wound to fit the stator cores 400 into the housing 500 by shrink fitting or press fitting forms the stator 300.

A three-phase alternating current is caused to flow into the coil 310 of each teeth core 350 from a three-phase circuit (not shown). Thus, a magnetic path is formed in the stator core 400, magnetic flux is generated from each teeth core 350, and a rotating magnetic field is generated in the stator 300. The housing 500 is made of a soft magnetic material so that the magnetic flux generated in each teeth core 350 can be prevented from leaking to the outside.

The stator core 400 and the rotor core 210 are configured by stacking a plurality of silicon steel plates and fastening them by caulking or an adhesive, for example. Thus, it is possible to improve the magnetic permeability and achieve the rotating electric machine 100 with low iron loss.

Figure 3:
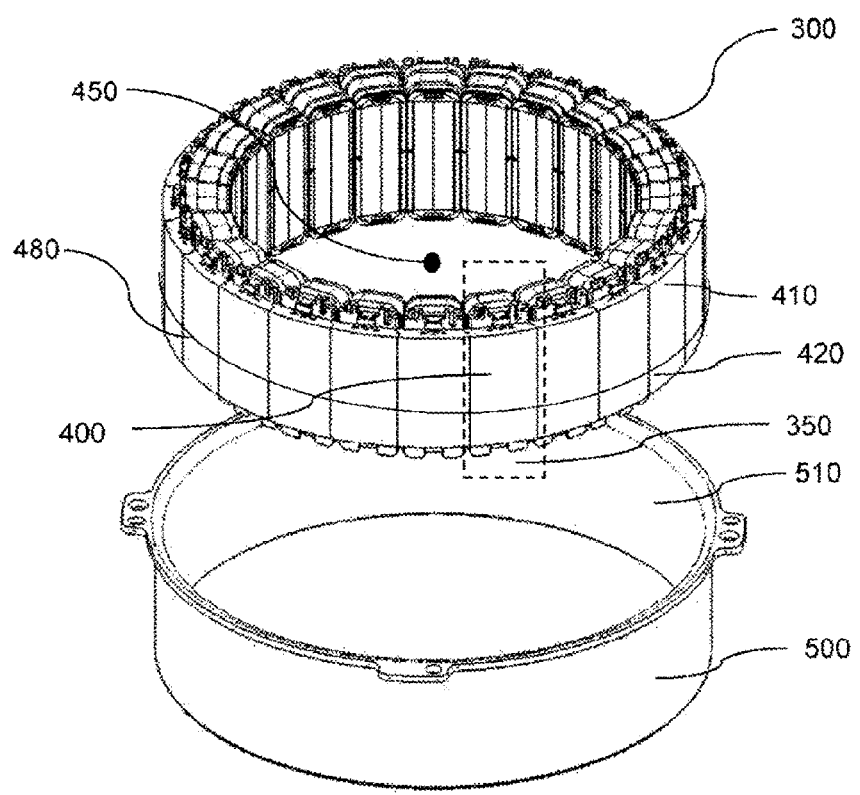
FIG. 3 is a diagram showing a state in which a plurality of teeth cores are arranged in an annular shape and fixed to the housing.

FIG. 3 is a diagram showing a state in which a plurality of teeth cores 350 are arranged in an annular shape and fixed to the housing 500. As shown in FIG. 3, the stator 300 is configured by inserting and fixing the plurality of teeth cores 350 in a state of being arranged in an annular shape into the housing 500 having a cylindrical shape. The rotor 200 is arranged on the inner circumferential side of the stator 300 as described above, but is not shown in FIG. 3.

In FIG. 3, the point indicated by reference numeral 450 indicates the center of the rotating electric machine 100, that is, the center of the rotating electric machine being the center of the rotor 200, the rotating shaft 250, and the stator 300. Rotationally driving the rotor 200 around the rotating electric machine center 450 causes the rotating shaft 250 that is arranged so that the rotating electric machine center 450 is defined as a central axis to be rotated.

As shown in FIG. 3, a plurality of stator cores 400, arranged in an annular shape, forming the respective teeth cores 350 each have outer circumferential surfaces 410 and 420. In the outer circumferential surface of the stator core 400 arranged to face the inner circumferential surface of the housing 500, the outer circumferential surface 410 is a portion on a side on which a connection terminal (not shown) connected to the coil 310 is arranged, that is, on the upper side shown in FIG. 3. On the other hand, in the outer circumferential surface of the stator core 400 arranged to face the inner circumferential surface of the housing 500, the outer circumferential surface 420 is a portion on a side opposite in the axial direction to the side on which the connection terminal described above is arranged, that is, on the lower side shown in FIG. 3. It should be noted that here, for convenience of description, the outer circumferential surface 410 and the outer circumferential surface 420 are distinguished from each other, but in reality, these integrally form the outer circumferential surface of the stator core 400. The total outer circumferential surface 480 is an outer circumferential surface of the stator 300 formed by combining the outer circumferential surface 410 and the outer circumferential surface 420 of each stator core 400.

The housing 500 has an inner circumferential surface 510 inside. When the inner circumferential surface 510 comes into contact with the total outer circumferential surface 480 of the stator 300, a plurality of stator cores 400 (teeth cores 350) arranged in an annular shape is fixed to the housing 500 by frictional force. The joining strength between the housing 500 and the stator core 400 at this time, that is, the fixing force with which the stator core 400 is fixed to the housing 500 is determined depending on the difference in size in the radial direction between the inner circumferential surface 510 and the total outer circumferential surface 480.

Figure 4:
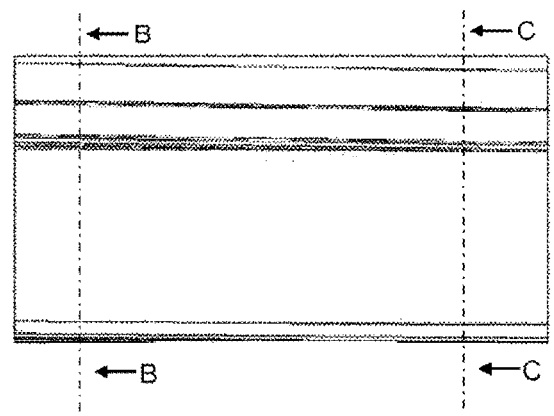
FIG. 4 is a diagram showing the shape of the stator core.
Figure 4:
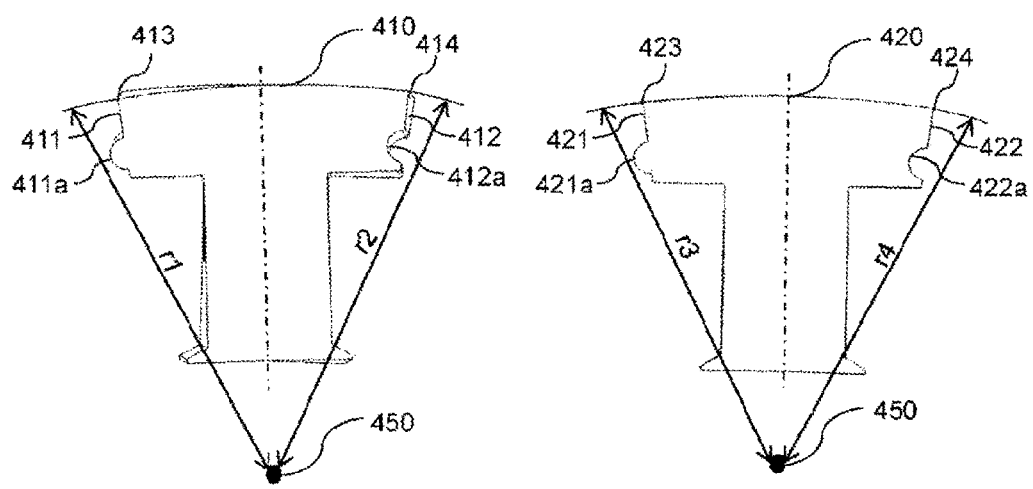

FIG. 4 is a diagram showing the shape of the stator core 400. FIG. 4(a) is a side view of the stator core 400 viewed from the circumferential direction of the rotating electric machine 100. FIG. 4(b) is a cross-sectional view of the stator core 400 taken along line B-B shown in FIG. 4(a). FIG. 4(c) is a cross-sectional view of the stator core 400 taken along line C-C shown in FIG. 4(a).

As shown in FIG. 4(b), the stator core 400 has an fastening portion 411 and a T fastening portion 412 being the close-contact surfaces with other adjacent stator cores 400 on the left and right of the outer circumferential surface 410. The S fastening portion 411 and the fastening portion 412 are respectively formed with a protruding portion 411a and a recessed portion 412a each of which acts as an alignment guide when the plurality of stator cores 400 are arranged side by side in an annular shape. That is, the protruding portion 411a is fitted into the recessed portion 412a of the adjacent stator core 400, and the recessed portion 412a is fitted into the protruding portion 411a of the adjacent stator core 400, so that positioning at the time of annularly arranging each stator core 400 is performed.

In addition, as shown in FIG. 4(b), the point where the boundary line between the S fastening portion 411 and the outer circumferential surface 410 intersects the cross section B-B is defined as an S vertex 413, and the distance from the rotating electric machine center 450 described above to the S vertex 413 is defined as r1. Similarly, the point where the boundary line between the T fastening portion 412 and the outer circumferential surface 410 intersects the cross section B-B is defined as a T vertex 414, and the distance from the rotating electric machine center 450 to the T vertex 414 is defined as r2. In this case, setting the distance r1 and the distance r2 to different values makes it possible to set the shape of the outer circumferential surface 410 to be left-right asymmetrical.

As shown in FIG. 4(c), the stator core 400 has a V fastening portion 421 and a W fastening portion 422 being the close-contact surfaces with other adjacent stator cores 400 on the left and right of the outer circumferential surface 420. The V fastening portion 421 and the W fastening portion 422 are respectively formed with a protruding portion 421a and a recessed portion 422a each of which acts as an alignment guide when the plurality of stator cores 400 are arranged side by side in an annular shape. That is, the protruding portion 421a is fitted into the recessed portion 422a of the adjacent stator core 400, and the recessed portion 422a is fitted into the protruding portion 421a of the adjacent stator core 400, so that positioning at the time of annularly arranging each stator core 400 is performed.

In addition, as shown in FIG. 4(c), the point where the boundary line between the V fastening portion 421 and the outer circumferential surface 420 intersects the cross section C-C is defined as a V vertex 423, and the distance from the rotating electric machine center 450 described above to the V vertex 423 is defined as r3. Similarly, the point where the boundary line between the W fastening portion 422 and the outer circumferential surface 420 intersects the cross section C-C is defined as a W vertex 424, and the distance from the rotating electric machine center 450 to the W vertex 424 is defined as r4. In this case, setting the distance r3 and the distance r4 to different values makes it possible to set the shape of the outer circumferential surface 420 to be left-right asymmetrical.

It should be noted that in setting the distances r1 to r4, it is preferable to set r1>r2 and r3<r4, or in contrast, r1<r2 and r3>r4. In this way, slanting the outer circumferential surface 410 of the stator core 400 at one end portion in the axial direction and the outer circumferential surface 420 of the stator core 400 at the other end portion in the axial direction of the rotating electric machine 100 against each other in the opposite directions with respect to the inner circumferential surface 510 of the housing 500 makes it possible to achieve a stator core 400 having a twisted shape. Thus, as will be described below, the stator core 400 can be held in the housing 500 with high fixing force against both regenerative torque and driving torque.

Figure 5:
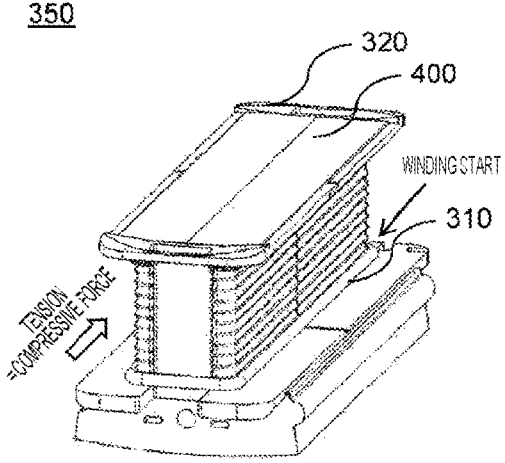
FIG. 5 is a diagram showing a state of the winding work.
Figure 5:
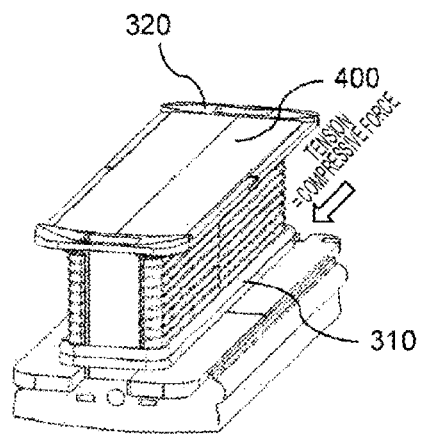

Next, one method for achieving the twisted shape of the stator core 400 described above will be described with reference to FIG. 5. FIG. 5 is a diagram showing a state of winding work for winding a coil 310 around a stator core 400 to create a teeth core 350. FIG. 5(a) shows a state of the first-stage winding work, and FIG. 5(b) shows a state of the second-stage winding work. It should be noted that appropriate tension applied to the coil 310 when the coil 310 is pulled by a winding mechanism (not shown). In this state, winding the coil 310 around the resin bobbin 320 attached to the stator core 400 in order from the first stage causes the teeth core 350 to be created.

As shown in FIG. 5(a), during the winding work at the first stage, for example, after the coil 310 is extended in the axial direction along the resin bobbin 320 from a predetermined winding start position, the coil 310 is extended to the opposite side in the axial direction from the point positioned on the diagonal line with respect to the winding start position toward the winding start position. Thus, the coil 310 is wound around the stator core 400 via the resin bobbin 320. In the winding work at the second stage shown in FIG. 5(b), the winding position of the coil 310 is shifted by one stage, and then the same work as that at the first stage is performed. Repeating this winding work causes the coil 310 to be wound around the stator core 400.

In the winding work described above, the coil 310 is pulled by appropriate tension, and thereby each of the coils 310 can be aligned at a predetermined winding position step by step. In addition, as shown in FIGS. 5(a) and 5(b), when the stator core 400 receives compressive forces in different directions on the left and right due to the tension of the coil 310, the stator core 400 twists in a predetermined direction. As a result, as described with reference to FIG. 4, it is possible to produce the stator core 400 having a twisted shape in which the outer circumferential surface 410 and the outer circumferential surface 420 are slanted against each other in opposite directions with respect to the inner circumferential surface 510 of the housing 500. That is, the outer circumferential surfaces 410 and 420 of the stator core 400 can be slanted along the diagonal line of the stator core 400 passing through the winding start position of the coil 310.

It should be noted that the method for achieving the twisted shape of the stator core 400 described above is merely an example, and another method may be adopted. As described in FIG. 4, if the outer circumferential surface 410 and the outer circumferential surface 420 can be slanted against each other in the opposite directions with respect to the inner circumferential surface 510 of the housing 500, the stator core 400 can be manufactured using any method.

Figure 6:
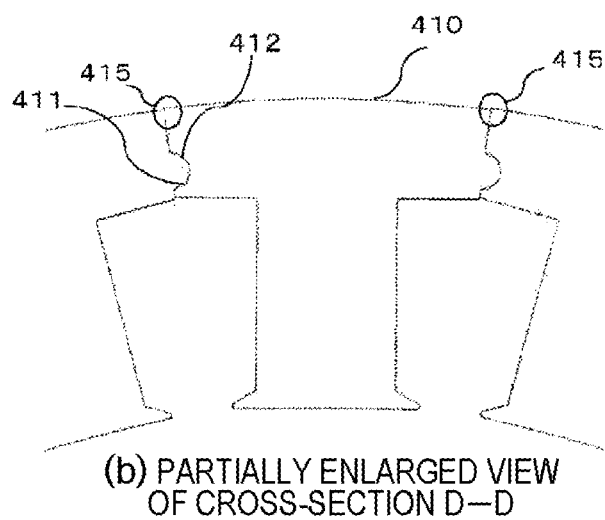
FIG. 6 is a diagram showing a state in which a plurality of stator cores are annularly arranged.
Figure 6:
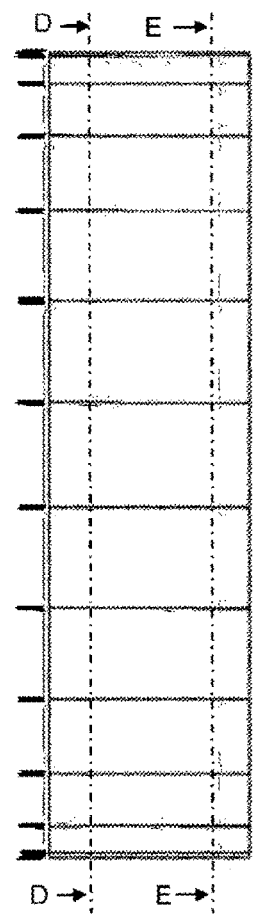
Figure 6:
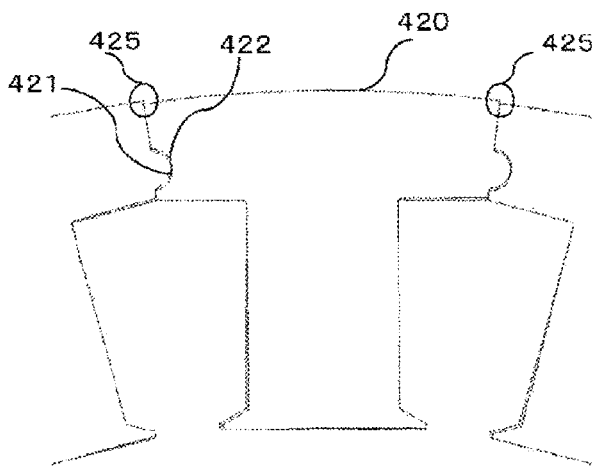

FIG. 6 is a diagram showing a state in which a plurality of stator cores 400 are annularly arranged in the stator 300. FIG. 6(a) is a side view of the stator 300 viewed from the radial direction of the rotating electric machine 100. FIG. 6(b) is a partially enlarged view of the stator 300 taken along line D-D shown in FIG. 6(a). FIG. 6(c) is a partially enlarged view of the stator 300 taken along line E-E shown in FIG. 6(a). It should be noted that the housing 500, the coil 310, and the resin bobbin 320 are not shown in FIG. 6 for easy understanding of the arrangement of the stator core 400.

As shown in FIG. 6(b), in the stator 300 in which a plurality of stator cores 400 are arranged side by side in an annular shape, the S fastening portion 411 of each stator core 400 is in contact with the T fastening portion 412 of the adjacent stator core 400. At this time, as described above, the protruding portion 411a of the fastening portion 411 and the recessed portion 412a of the T fastening portion 412 are fitted to each other, so that alignment of each stator core 400 is performed.

Here, assuming that the relationship between the S vertex 413 and the T vertex 414 described above is r1>r2, a step 415 is formed between the outer circumferential surfaces 410 of the two adjacent stator cores 400. It should be noted that the outer circumferential surface 410 of each stator core 400 is slanted in the same direction with respect to the inner circumferential surface 510 of the housing 500. Therefore, each step 415 of the outer circumferential surface 410 in the stator 300 has a clockwise protruding shape, that is, a shape continuously protruding when the above-described total outer circumferential surface 480 is viewed clockwise in the circumferential direction. It should be noted that in contrast to FIG. 6(b), r1<r2 may be used. In this case, each step 415 of the outer circumferential surface 410 in the stator 300 has a shape protruding counterclockwise.

As shown in FIG. 6(c), in the stator 300 in which a plurality of stator cores 400 are arranged side by side in an annular shape, the V fastening portion 421 of each stator core 400 is in contact with the W fastening portion 422 of the adjacent stator core 400. At this time, as described above, the protruding portion 421a of the V fastening portion 421 and the recessed portion 422a of the W fastening portion 422 are fitted to each other, so that alignment of each stator core 400 is performed.

Here, assuming that the relationship between the V vertex 423 and the W vertex 424 described above is r3<r4, a step 425 is formed between the outer circumferential surfaces 420 of the two adjacent stator cores 400. It should be noted that the outer circumferential surface 420 of each stator core 400 is slanted in the same direction with respect to the inner circumferential surface 510 of the housing 500. Therefore, each step 425 of the outer circumferential surface 420 in the stator 300 has a counterclockwise protruding shape, that is, a shape continuously protruding when the above-described total outer circumferential surface 480 is viewed counterclockwise in the circumferential direction.

As described above, in the plurality of stator cores 400 arranged side by side in an annular shape to form the stator 300, each step 415 in the outer circumferential surface 410 has a clockwise protruding shape. On the other hand, each step 425 in the outer circumferential surface 420 on an opposite side in the axial direction has a shape protruding counterclockwise in the opposite direction. Thus, the stator core 400 has a shape in which arranging a plurality of stator cores 400 side by side in an annular shape causes steps in directions opposite to each other between the outer circumferential surface 410 and the outer circumferential surface 420.

It should be noted that in contrast to FIGS. 6(*b*) and 6(*c*), r1<r2 and r3>r4 may be used. In this case, each step 415 of the outer circumferential surface 410 in the stator 300 has a shape protruding counterclockwise, and each step 425 of the outer circumferential surface 420 has a shape protruding clockwise in the opposite direction.

Figure 7:
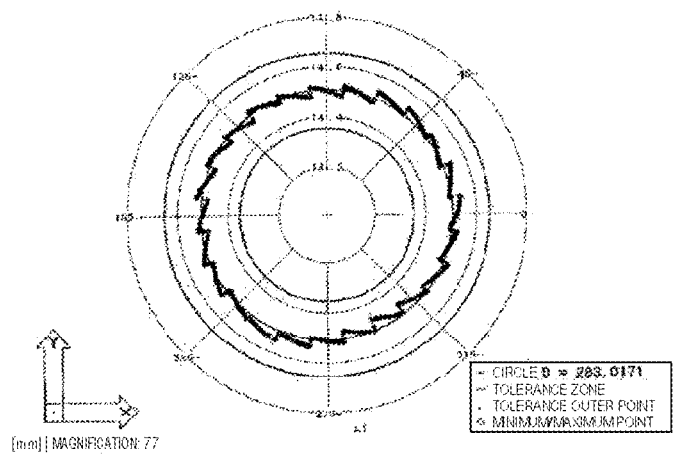
FIG. 7 is a diagram showing the measurement results of the cross-sectional shape of the stator.
Figure 7:
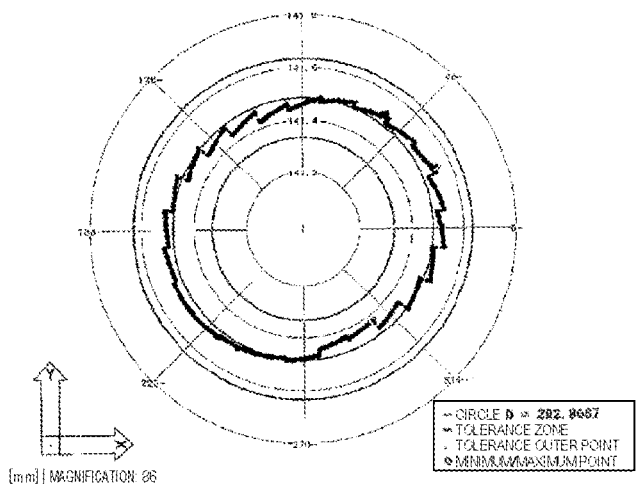

FIG. 7 is a diagram showing the measurement results of the cross-sectional shape of the stator 300. FIG. 7(*a*) shows a measurement result of a cross-sectional shape of the stator 300 taken along line D-D shown in FIG. 6(*a*). FIG. 7(*b*) shows a measurement result of a cross-sectional shape of the stator 300 taken along line E-E shown in FIG. 6(*a*). It should be noted that in the measurement result of the cross-sectional shape in FIG. 7, it is assumed that the conditions of r1>r2 and r3<r4 are satisfied as described above.

From the measurement result of the cross-sectional shape shown in FIG. 7(*a*), it can be seen that in the cross-section D-D, each step 415 in the outer circumferential surface 410 has a shape protruding clockwise and is aligned in one direction of the rotation direction of the rotating electric machine 100. In addition, from the measurement result of the cross-sectional shape shown in FIG. 7(*b*), it can be seen that in the cross-section E-E, each step 425 in the outer circumferential surface 420 has a shape protruding counterclockwise and is aligned in one direction of the rotation direction of the rotating electric machine 100 in a direction opposite to that in the cross-section D-D. Therefore, the stator core 400 can be held in the housing 500 with high fixing force against both the regenerative torque and the driving torque. It should be noted that in contrast to FIGS. 7(*a*) and 7(*b*), r1<r2 and r3>r4 may be used. Even in this case, the stator core 400 can be held in the housing 500 with high fixing force against both the regenerative torque and the driving torque.

According to the embodiment of the present invention described above, the following action and effect are produced.

(1) The rotating electric machine 100 includes a stator 300 in which a plurality of stator cores 400 are annularly arranged, a rotor 200 to be arranged on the inner circumferential side of the stator 300, and a housing 500 having a cylindrical shape for fixing each of the plurality of stator cores 400. The stator core 400 has outer circumferential surfaces 410 and 420 arranged to face the inner circumferential surface 510 of the housing 500, and the outer circumferential surfaces 410 and 420 of the stator core 400 are slanted with respect to the inner circumferential surface 510 of the housing 500. Thus, the fixing force of the stator core 400 can be improved at low cost.

(2) The outer circumferential surface 410 of t stator core 400 at one end portion in the axial direction and the outer circumferential surface 420 of the stator core 400 at the other end portion in the axial direction of the rotating electric machine 100 are slanted against each other in the opposite directions with respect to the inner circumferential surface 510 of the housing 500 as described with reference to FIG. 4. Thus, the stator core 400 can be held in the housing 500 with high fixing force against both the regenerative torque and the driving torque.

(3) The rotating electric machine 100 includes a plurality of coils 310 wound around the plurality of respective stator cores 400. As described in FIG. 5, when the stator core 400 is subjected to the tension of the coil 310 to twist, the outer circumferential surfaces 410 and 420 of the stator core 400 can be slanted with respect to the inner circumferential surface 510 of the housing 500. That is, the outer circumferential surfaces 410 and 420 of the stator core 400 can be slanted along the diagonal line of the stator core 400 passing through the winding start position of the coil 310. In this way, it is possible to manufacture a stator core 400 with the outer circumferential surfaces 410 and 420 being slanted, by a simple manufacturing method without using a mold having a special shape.

(4) As described with reference to FIGS. 6 and 7, the respective outer circumferential surfaces 410 of a plurality of stator cores 400 are slanted in the same direction with respect to the inner circumferential surface 510 of the housing 500. Similarly, the respective outer circumferential surfaces 420 of the plurality of stator cores 400 are also slanted in the same direction with respect to the inner circumferential surface 510 of the housing 500. Thus, the stator 300 configured by arranging a plurality of stator cores 400 in an annular shape can be held in the housing 500 with high fixing force in each direction in which the rotating electric machine 100 is rotationally driven.

(5) The plurality of stator cores 400 are fixed to the inner circumferential side of the housing 500 by interference fit. Thus, each stator core 400 can be reliably and firmly fixed to the housing 500.

It should be noted that in the embodiment of the present invention described above, as described with reference to FIG. 4, an example has been described of achieving a stator 300 that can be fixed to the housing 500 with high fixing force using the stator core 400 having a twisted shape in which the outer circumferential surface 410 and the outer circumferential surface 420 are slanted against each other in opposite directions with respect to the inner circumferential surface 510 of the housing 500. However, this may be achieved using stator cores of other shapes. For example, on the outer circumferential surfaces 410 and 420 of the stator core, respective center lines along the axial direction of the rotating electric machine 100 may be defined, and a stator core having a shape in which the slant of the outer circumferential surface is discontinuously switched in the circumferential direction with this center line as a boundary may be used. At this time, setting the slant directions of the outer circumferential surface 410 and the outer circumferential surface 420 to be directions opposite to each other allows the same action and effect as in the stator core 400 having a twisted shape described in FIG. 4 to be produced. Alternatively, a stator core provided with respective protruding portions in the outer circumferential surface 410 and the outer circumferential surface 420 may be used. At this time, setting the positions of the protruding portions of the outer circumferential surface 410 and the outer circumferential surface 420 to be opposite to each other in the circumferential direction allows the same action and effect as in the stator core 400 having a twisted shape described in FIG. 4 to be produced. In addition to these, the present invention can be achieved using stator cores of various shapes.

The above-described embodiment and various modifications are merely examples, and the present invention is not limited to these contents as long as the characteristics of the present invention are not impaired. In addition, although various embodiments and modifications are described above, the present invention is not limited to these contents. Other aspects conceivable within the scope of the technical idea of the present invention are also included in the scope of the present invention.

REFERENCE SIGNS LIST 100 rotating electric machine
200 rotor
210 rotor core
220 permanent magnet
250 rotating shaft
300 stator
310 coil
320 resin bobbin
350 teeth core
400 stator core
410, 420 outer circumferential surface
450 rotating electric machine center
500 housing
510 inner circumferential surface

The invention claimed is:

1. A rotating electric machine comprising:
a stator in which a plurality of stator cores are annularly arranged;
a rotor arranged on an inner circumferential side of the stator;
a housing having a cylindrical shape and configured to fix each of the plurality of stator cores,
wherein each of the stator cores has an outer circumferential surface arranged to face the inner circumferential surface of the housing, and
wherein the outer circumferential surface of each of the stator cores is slanted with respect to the inner circumferential surface of the housing,
wherein the outer circumferential surface of each of the stator cores at one end portion in an axial direction and the outer circumferential surface of each of the stator cores at another end portion in the axial direction of the rotating electric machine are slanted against each other in opposite directions with respect to the inner circumferential surface of the housing; and
a plurality of coils wound around the plurality of respective stator cores, and
wherein when each of the stator cores is subjected to tension of each of the coils to twist, the outer circumferential surface of each of the stator cores is slanted with respect to the inner circumferential surface of the housing,
wherein the outer circumferential surface of adjacent stator cores at the one end portions form a step having a clockwise protruding shape, and the outer circumferential surface of adjacent stator cores at the another end portions form a step having a counterclockwise protruding shape.

2. The rotating electric machine according to claim 1, wherein the outer circumferential surface of each of the stator cores is slanted along a diagonal line of each of the stator cores passing through a winding start position of each of the coils.

3. The rotating electric machine according to claim 1, wherein the respective outer circumferential surfaces of the plurality of stator cores are slanted in an identical direction with respect to an inner circumferential surface of the housing.

4. The rotating electric machine according to claim 1, wherein the plurality of stator cores are fixed to the inner circumferential side of the housing by interference fit.

5. A stator used in a rotating electric machine, the stator comprising a plurality of stator cores arranged in an annular shape, each of the plurality of stator cores being fixed to a housing having a cylindrical shape,
wherein each of the stator cores has an outer circumferential surface arranged to face an inner circumferential surface of the housing, and
wherein the outer circumferential surface of each of the stator cores is slanted with respect to the inner circumferential surface of the housing,
wherein the outer circumferential surface of each of the stator cores at one end portion in an axial direction and the outer circumferential surface of each of the stator cores at another end portion in the axial direction of the rotating electric machine are slanted against each other in opposite directions with respect to the inner circumferential surface of the housing,
wherein the outer circumferential surface of adjacent stator cores at the one end portions form a step having a clockwise protruding shape, and the outer circumferential surface of adjacent stator cores at the another end portions form a step having a counterclockwise protruding shape.

* * * * *